No. 631,153.  
M. J. CLARK.  
CROSSCUT SAW.  
(Application filed Apr. 18, 1899.)

Patented Aug. 15, 1899.

(No Model.)  
2 Sheets—Sheet 1.

WITNESSES:  
L. Almquist.  
J. Fedotcher

INVENTOR  
Matthew J. Clark.  
BY  
ATTORNEYS.

No. 631,153. Patented Aug. 15, 1899.
M. J. CLARK.
CROSSCUT SAW.
(Application filed Apr. 18, 1899.)
(No Model.) 2 Sheets—Sheet 2.
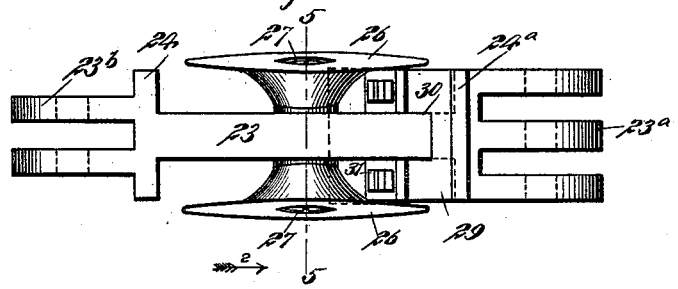
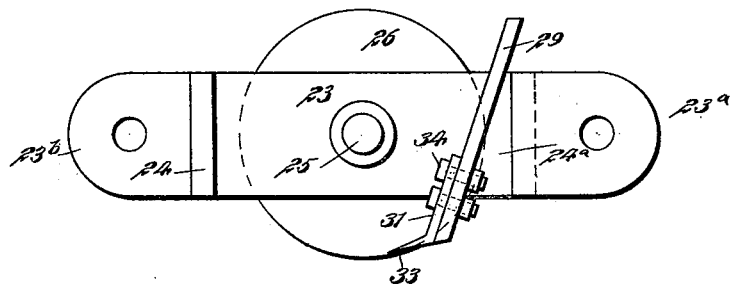
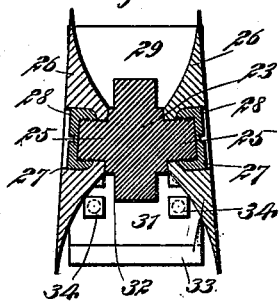
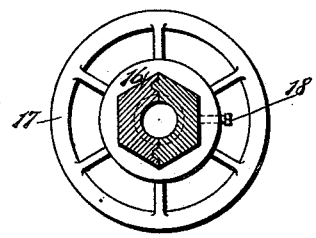
WITNESSES:
L. Almquist
Fred Seker
INVENTOR
Matthew J. Clark.
BY
[signature]
ATTORNEYS.
THE NORRIS PETERS CO., PHOTO-LITHO., WASHINGTON, D. C.

UNITED STATES PATENT OFFICE.

MATTHEW J. CLARK, OF CHAPARAL, ARIZONA TERRITORY.

CROSSCUT-SAW.

SPECIFICATION forming part of Letters Patent No. 631,153, dated August 15, 1899.

Application filed April 18, 1899. Serial No. 713,440. (No model.)

*To all whom it may concern:*

Be it known that I, MATTHEW J. CLARK, of Chaparal, in the county of Yavapai and Territory of Arizona, have invented a new and Improved Crosscut-Saw, of which the following is a full, clear, and exact description.

The object of the invention is to provide a crosscut band or chain saw and means for applying the saw to logs or trees and for rotating the saw in contact with the object to be cut.

A further object of the invention is to so construct the crosscut-saw that it will be simple, durable, and economic and will perform its work much more rapidly and effectively than the ordinary saw, and also so that the improved saw can be operated with less expenditure of strength than is at present required.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
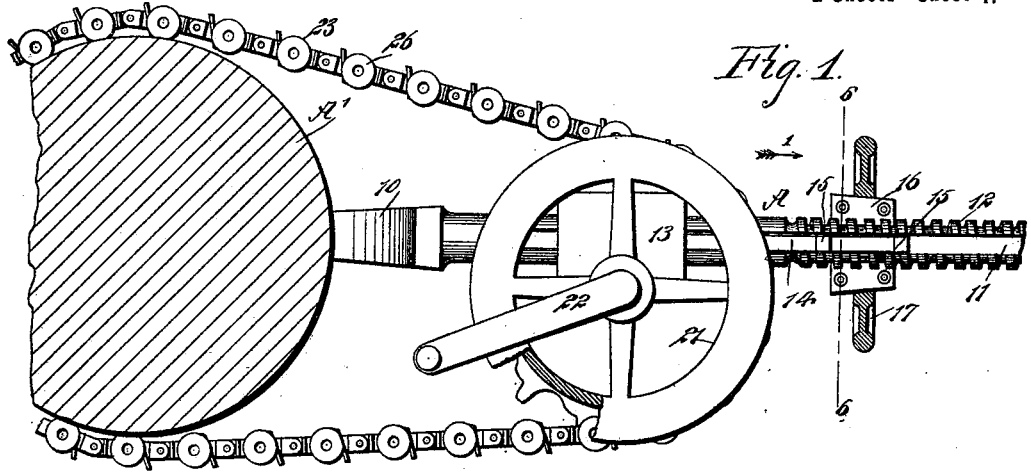
Figure 2:
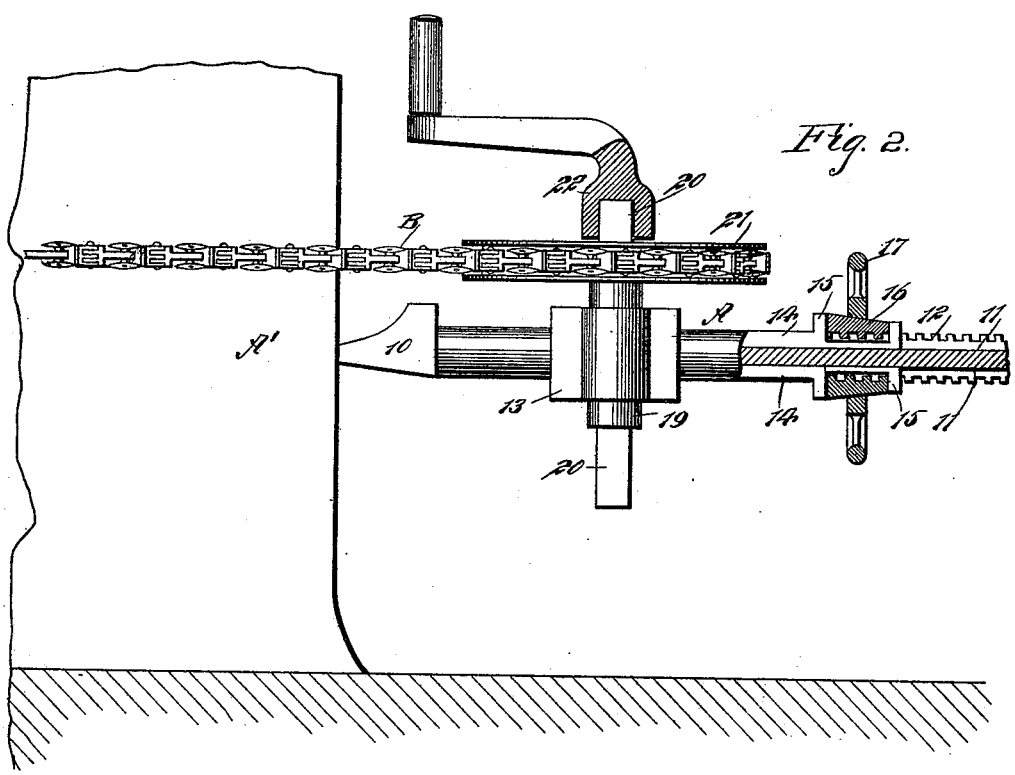

Figure 1 is a plan view of the improved saw, portions thereof being broken away and in section. Fig. 2 is a side elevation of the improved saw, portions being in section. Fig. 3 is an enlarged side elevation of a link of the saw. Fig. 4 is a plan view of one of the links of the saw, the upper cutter being removed. Fig. 5 is a vertical section taken practically on the line 5 5 of Fig. 3, and Fig. 6 is a similar section taken substantially on the line 6 6 of Fig. 1.

A represents a bar provided with a head 10, adapted for engagement with a log or tree A' to be sawed. The bar A is provided at its outer end with longitudinal grooves 11, said grooves being made, respectively, in the upper and lower surfaces of the bar, as shown in Fig. 2, and the outer end portion of the bar is further provided with an exterior thread 12.

A box 13 is mounted to slide upon the plain portion of the bar A, and said box is provided with outwardly-extending arms 14, which arms are adapted to slide in the grooves 11 of the bar, and at the outer end of each arm two lugs 15 are produced, the outer lug being of less height than the inner one, as is best shown in Fig. 2.

A nut 16 is located between the flanges 15 on the arms of the box 13, the thread of the nut being adapted to engage with the threaded surface of the bar A. The nut is conical or tapering and is constructed in two sections, as shown in Figs. 1 and 6, so that the nut may be readily removed from the bar, and one section of the nut is provided with recesses and the other section with lugs adapted to enter said recesses. The sections of the nut are held together by placing upon said nut a hand-wheel 17, the bore of the hub of said hand-wheel having a taper corresponding practically to the taper of the nut. After the hand-wheel 17 has been forced to place upon the nut 16 said hand-wheel is held firmly in position by a set-screw 18, as is illustrated in Fig. 6.

A shaft 19 is journaled in a bearing located preferably at one side of the box 13, and both ends of said shaft 19 are provided with straight faces 20, so that the ends of the shaft are polygonal in cross-section. Either end of the shaft is adapted to receive a sprocket-wheel 21, said sprocket-wheel being provided with marginal flanges, as shown in Figs. 1 and 2, and the wheel is held in place by securing a handle 22 upon the extremity of the shaft adjacent to which the wheel is placed.

The saw B consists of a series of links 23, pivotally connected to form an endless chain. One of these links is shown in detail in Figs. 3 and 4, in which it will be observed that at one end of the body of the link an upwardly and a downwardly extending flange 24 is produced, while a second flange 24ª extends above the top and bottom surfaces of the link-body at its opposite end. The inner faces of the flanges 24 are straight; but the inner faces of the flanges 24ª are inclined from the inner edge of the link outwardly, as is best shown in Fig. 4. A forked section is formed at each end of the link, one forked section consisting of three leaves or tines 23ª, that are horizontally projected one above the other from the outer surfaces of the flanges 24ª, the other forked section comprising but two leaves or tines 23ᵇ, that are horizontally projected one above the other from the flanges 24 of the link. In assembling the links the two leaves 23ᵇ of one link are made to enter the spaces between the three leaves 23ª of an adjacent link, and pivot-pins are passed through the interlocking leaves or tines, the latter being provided with suitable apertures to receive the pins or bolts.

A stud 25 is projected from the central portion of the top and bottom surface of each link, and said studs are given an inclination in direction of the outer side of the link. Each stud is adapted to receive a cutting-section of the saw, and each section consists of a circular knife or cutting-wheel 26. The upper face of the upper wheel is flat, as is likewise the under or lower face of the lower cutting-wheel, while the inner faces of said wheels are more or less inclined or concaved, as shown in Figs. 3 and 5. Each cutting-wheel or circular knife is provided with a central opening 27, and each opening is of less diameter at its inner end than at its outer end. The openings 27 at their inner ends are adapted to loosely receive the studs 25 on the links 23, and the circular knives or cutting-wheels are prevented from leaving the studs by caps 28, screwed upon the outer end-portions of the studs, as shown particularly in Fig. 5. Owing to the inclination of the studs 25 the space between the cutting edges of the cutting-wheels or circular knives is much wider at the inner side of the chain-saw than at the outer side. This inclination is given to the cutting-wheels in order that the cutting or peripheral edges only of said wheels will engage with the wood to be sawed, and consequently the disks will not be liable to become jammed in the kerf.

A plate 29 is secured in any suitable or approved manner upon the inner inclined face of the flange 24ª of each link, and the plate 29 therefore extends diagonally of a link and beyond the inner and outer side faces of said link. The plate 29 is of such width that it fits between the inner or opposing surfaces of the cutting-wheels on the link, as is shown in Figs. 3 and 5, and in order that but a single plate may be employed said plate 29 is provided with a longitudinal recess 30, that receives the link, one wall of the recess engaging with the upper surface of the link and the other wall with the under surface of the same, as shown in Fig. 3. A chisel 31 is located at the inner end of the plate 29, and the said chisel is provided with a longitudinal groove 32, corresponding to the groove 30 in the plate 29, the groove in the chisel being adapted to receive the inner edge portion of a link, as shown in Fig. 5. The chisel is provided with a cutting-section or knife-edge 33, said section being at an obtuse angle to the body of the chisel, and it extends in a direction that will bring its edge at a right angle with the cutting edges of the cutting-wheels. The chisel is adapted to detach a layer of wood cut by the wheels, and the wood lifted by the chisel is forced upward and downward from the link carrying the chisel, thus leaving the cut or kerf clean for the succeeding link.

The rim of the sprocket-wheel 21 must be conformable to the inside surface of the chain-saw and must not touch the cutting edges of the cutting-wheels. Preferably about every three or six feet of chain is provided with a special rivet or bolt, fastened by a key, so that the length of the chain may be increased or lessened, as required.

If the tree or log to be sawed is very large, an extra bar, with gearing, may be set up at the opposite side and the force thus increased. When the tree or log has been cut well through on both sides, one of the bars, when two are used, may be removed and the cutting continued in direction of the remaining bar.

Having thus described my invention, I claim as new and desire to secure by Letters Patent—

1. A saw, comprising a series of links pivotally connected to form an endless chain, and cutting-wheels mounted to revolve upon the upper and lower surfaces of the links of the said chain, for the purpose set forth.

2. In a saw, an endless chain, cutting-wheels mounted to revolve upon the links of the chain, and a chisel located adjacent to each pair of cutting-wheels, as and for the purpose set forth.

3. A saw consisting of a series of links connected to form an endless chain, and a cutting-wheel mounted to revolve at the top and bottom surfaces of sundry of the links, a greater space being provided between the cutting edges of the cutting-wheels on each disk at the inner face of the chain than at the outer face of said chain, for the purpose specified.

4. A saw consisting of a series of links connected to form an endless chain, and a cutting-wheel mounted to revolve at the top and bottom surfaces of sundry of the links, a greater space being provided between the cutting edges of the cutting-wheels on each link at the inner face of the chain than at the outer face of said chain, and chisels likewise connected with said links, said chisels extending between the inner or opposing faces of the cutting-wheels, as described.

5. A saw consisting of an endless chain, cutting-wheels mounted to revolve upon the links of the chain, a sprocket-wheel over which the chain is adapted to pass, and a support for the said sprocket-wheel, substantially as described.

6. A saw, consisting of an endless chain, cutting-wheels mounted to revolve upon the links of the chain, a sprocket-wheel over which the chain is adapted to pass, a support for the said sprocket-wheel, and means, substantially as described, for revolving the sprocket-wheel and for adjusting said support to or from the object to be operated upon, as described.

7. The combination, with a chain or band crosscut-saw, of a bar provided with a head adapted for engagement with an object to be cut, the opposite end of the bar being exteriorly threaded and provided with longitudinal grooves, a box mounted to slide upon the plain portion of the bar, having arms extending within the grooves of the bar, the said arms being provided with opposing flanges, a nut mounted to turn in engagement with the threaded surface of the bar and between the flanges of the arms projected from the box, a shaft journaled in the said box, and a sprocket-wheel adapted to receive the chain or band saw, said sprocket-wheel being secured upon said shaft, and means for imparting movement to the shaft, as described.

8. A saw, comprising a number of links pivotally joined, cutters revolubly mounted on the links, and additional cutters stationary on the links and acting in conjunction with the revoluble cutters.

MATTHEW J. CLARK.

Witnesses:
MARSHAL C. PARMLEY,
CHARLES J. DUANE.